United States Patent [19]

Hearn et al.

[11] Patent Number: 5,564,726

[45] Date of Patent: Oct. 15, 1996

[54] TRAINING ATTACHMENT FOR A BICYCLE

[76] Inventors: Steven R. Hearn, 7108 O'Brien Ct.; Michael J. Remesi, 4704 Brownes Ferry Rd., both of Charlotte, N.C. 28269

[21] Appl. No.: 428,007

[22] Filed: Apr. 24, 1995

[51] Int. Cl.$^6$ .................................................. B62H 7/00
[52] U.S. Cl. .................. 280/293; 280/288.4; 248/231.61
[58] Field of Search ..................... 280/293, 292, 280/288.4, 304.1, 304.5, 204; 434/247; 74/543, 544, 551.8; 248/225.3, 231.6, 230.1, 219.1, 541, 229.24, 188; 24/525, 569; 224/329, 39

[56] References Cited

U.S. PATENT DOCUMENTS

| | | | |
|---|---|---|---|
| 627,225 | 6/1899 | Eifler | 224/39 R |
| 632,858 | 9/1899 | Waibel et al. | 248/231.61 |
| 1,928,626 | 10/1933 | Lesage | 248/231.61 |
| 2,179,365 | 11/1939 | Williams | 248/231.61 |
| 2,190,463 | 2/1940 | Watt | 24/569 |
| 4,134,364 | 1/1979 | Boncela | 280/288.4 |
| 4,840,391 | 6/1989 | Schneider | 280/304.1 |
| 5,154,096 | 10/1992 | Geller et al. | 280/293 |
| 5,259,638 | 11/1993 | Krauss et al. | 280/293 |
| 5,338,204 | 8/1994 | Herndon | 280/293 |

OTHER PUBLICATIONS

Published by Student Rider, Student Rider Owner's Manual Safety Training Handle, 3 pages attached, and Copyrighted in 1995.

*Primary Examiner*—Anne Marie Boehler
*Attorney, Agent, or Firm*—W. Thad Adams, III, P.A.

[57] ABSTRACT

A training attachment for a bicycle is provided. The training attachment is used by a trainer for assisting a trainee rider of the bicycle in maintaining balance. The bicycle includes a frame carrying a seat, front and rear wheels, and a handle bar for steering. The training attachment includes an elongate control bar and a mounting plate with a resilient spacer. The mounting plate serves to attach a proximal end of the control bar to the frame of the bicycle, and to support a free end of the control bar in an outwardly extending access position for use by the trainer.

8 Claims, 4 Drawing Sheets

TRAINING ATTACHMENT FOR A BICYCLE

TECHNICAL FIELD AND BACKGROUND OF THE INVENTION

This invention relates to a training attachment for a bicycle. The invention is used in combination with a standard bicycle, and is especially provided for use by a trainer for assisting a trainee rider of the bicycle in maintaining balance. In alternative applications, the invention may be used by a parent to control the speed of his child riding the bicycle, or for assisting his child up steep hills.

Training devices, such as wheel attachments, have been used in the past by parents for teaching their child how to ride a bicycle. For many children, such devices are not sufficiently challenging, and become relatively useless as a teaching aid over a short period of time. When the training wheels are removed, the child is generally not prepared to ride the bicycle completely unassisted. Thus, the parent typically helps the control the bicycle by holding the handle bar or seat and running alongside of the bicycle as the child peddles. Without the security of his parent by his side, the child is reluctant to attempt maneuvering the bicycle on his own. In most instances, this ultimately increases the amount of time and practice required before the child learns to comfortably ride the bicycle without any assistance.

The training attachment of the present invention allows the parent to maintain full control of the bicycle from a remote position outside of the view of the child rider. This gives the child a sense of riding on his own, and builds confidence without risking injury. As a result, the child quickly and safely learns to ride his bicycle.

SUMMARY OF THE INVENTION

Therefore, it is an object of the invention to provide a bicycle training attachment for use by a trainer to teach a trainee rider how to ride a bicycle on his own.

It is another object of the invention to provide a training attachment for use by a trainer for controlling the balance of a trainee rider.

It is another object of the invention to provide a bicycle training attachment which promotes fast learning with relatively little risk of injury to the rider.

It is another object of the invention to provide a training attachment which when used by the trainer instills confidence in the rider to peddle and steer on his own.

It is another object of the invention to provide a training attachment which can be readily attached to and removed from the bicycle frame.

It is another object of the invention to provide a training attachment which is adaptable to fit bicycles of various sizes and frame designs.

It is another object of the invention to provide a training attachment which is relatively inexpensive to manufacture.

It is another object of the invention to provide a training attachment for a bicycle which negates the need and relatively high cost of training wheels.

These and other objects of the present invention are achieved in the preferred embodiments disclosed below by providing the combination of a bicycle and a training attachment. The training attachment is used by a trainer for assisting a trainee rider of the bicycle in maintaining balance. The bicycle includes a frame carrying a seat, front and rear wheels, and a handle bar for steering. The training attachment includes an elongate control bar and attachment means. The attachment means serves to attach a proximal end of the control bar to the frame of the bicycle, and to support a free end of the control bar in an outwardly extending access position for use by the trainer.

According to one preferred embodiment of the invention, the bicycle frame includes a seat stay having first and second spaced apart support legs extending downwardly and rearwardly from the seat of the bicycle to the rear wheel. The attachment means includes a mounting plate for interconnecting the control bar and the first and second support legs of the seat stay, thereby attaching the control bar to the bicycle frame.

According to another preferred embodiment of the invention, the attachment means includes a second mounting plate spaced apart from first mounting plate and cooperating with the first mounting plate to clamp the support legs of the seat stay therebetween.

According to yet another preferred embodiment of the invention, a threaded bolt extends though the first and second mounting plates. The bolt cooperates with a complementary threaded nut to connect the first and second mounting plates together in clamping relation to the support legs of the seat stay.

According to yet another preferred embodiment of the invention, a resilient spacer is located between the first and second mounting plates to permit adjustment of the attachment means relative to the diameter of the first and second support legs and to the lateral spacing between the first and second support legs.

Preferably, the resilient spacer is formed of a rubber material.

According to another preferred embodiment of the invention, a handle grip is located on the free end of the control bar.

A bicycle training attachment is provided for use by a trainer for assisting a trainee rider of the bicycle in maintaining balance. The bicycle includes a frame carrying a seat, front and rear wheels, and a handle bar for steering. The training attachment includes an elongate control bar, and attachment means for attaching a proximal end of the control bar to the frame of the bicycle. The attachment means supports a free end of the control bar in an outwardly extending access position for use by the trainer.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
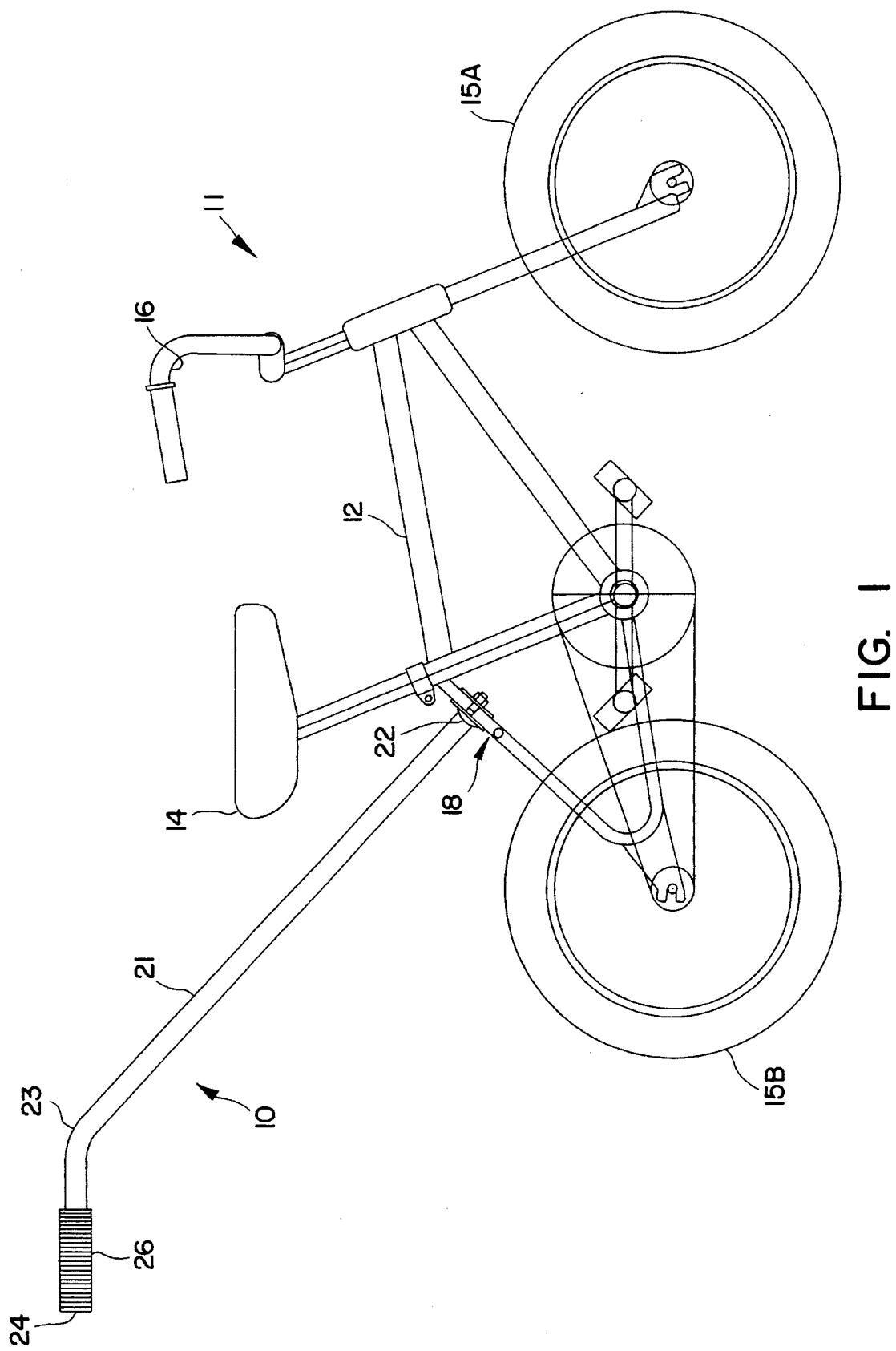
FIG. 1 is a side elevational view of a bicycle including a training attachment according to one embodiment of the invention.

Referring now specifically to the drawings, a training attachment according to the present invention is illustrated in FIG. 1 and shown generally at reference numeral 10. The training attachment 10 is used in combination with a standard bicycle 11, and is especially provided for use by a trainer for assisting a trainee rider of the bicycle 11 in maintaining balance. In alternative applications, the training attachment 10 may be used by a parent to control the speed of his child riding the bicycle 11, or for assisting his child up steep hills.

Figure 2:
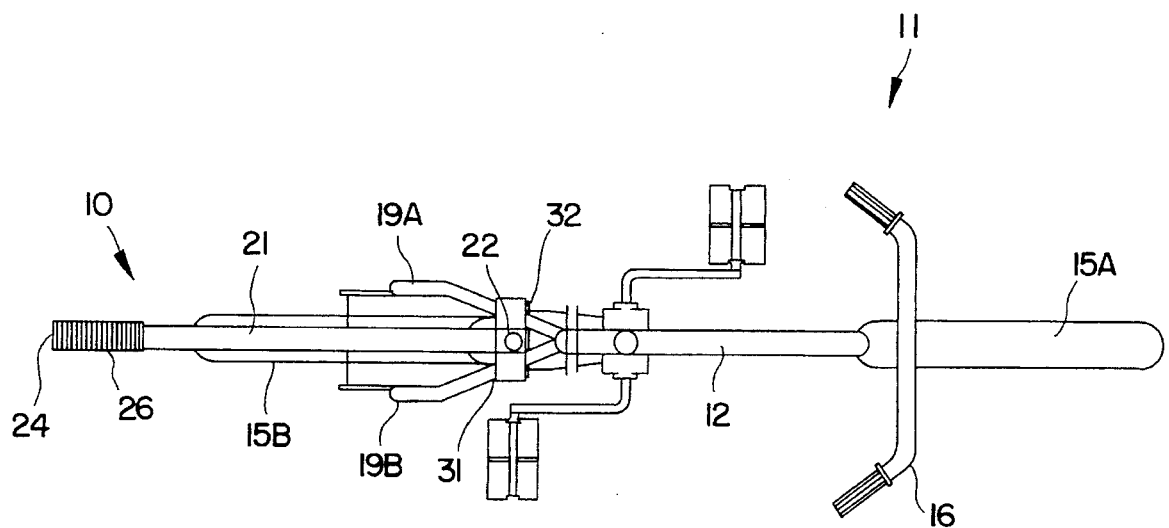
FIG. 2 is a top plan view of the bicycle with the seat removed to more clearly illustrate the training attachment shown in FIG. 1.
Figure 3:
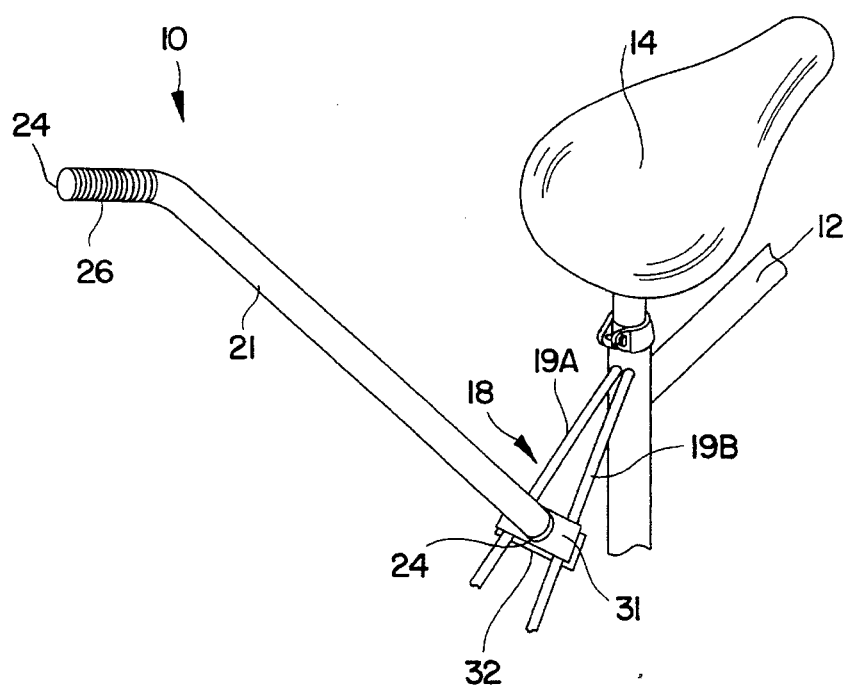
FIG. 3 is a fragmentary perspective view of the bicycle, and showing the location of the training attachment on the frame of the bicycle.

As shown in FIGS. 1, 2, and 3, the bicycle 11 has a frame 12 carrying a seat 14, front and rear wheels 15A and 15B, and a handle bar 16 for steering. The frame 12 of the bicycle 11 includes a seat stay 18 having first and second spaced apart support legs 19A and 19B (FIG. 3) extending downwardly and rearwardly from the seat 14 to the rear wheel 15B of the bicycle 11.

The training attachment 10 includes an elongate control bar 21 which is preferably removably joined at its proximal end 22 to the support legs 19A and 19B of the seat stay 18. According to one embodiment, the control bar 21 has a 1.0 inch diameter, and is approximately 2.0 feet in length as measured from the proximal end 22 of the control bar 21 to a curved portion 23 of the control bar 21. The distance from the curved portion 23 to a free end 24 of the control bar 21 is approximately 6–8 inches. The control bar 21 is preferably formed of steel pipe or a rigid PVC plastic material.

As best shown in FIG. 1, the control bar 21 extends upwardly and outwardly from the rear of the bicycle 11 to an access position for ready and convenient use by the trainer as the trainer walks or runs alongside or behind the trainee rider. A plastic handle grip 26 is located at the free end 24 of the control bar 21 for being gripped by the trainer to steady the balance of the trainee rider as necessary.

In an alternative embodiment (not shown), the training attachment may include a bicycle-type handle bar welded to the free end of the control bar, and having two hand grips for providing the trainer with further control over the trainee rider. In addition, the training attachment may be located and attached at any other point on the bicycle, such as the seat post or handle bar.

Figure 4:
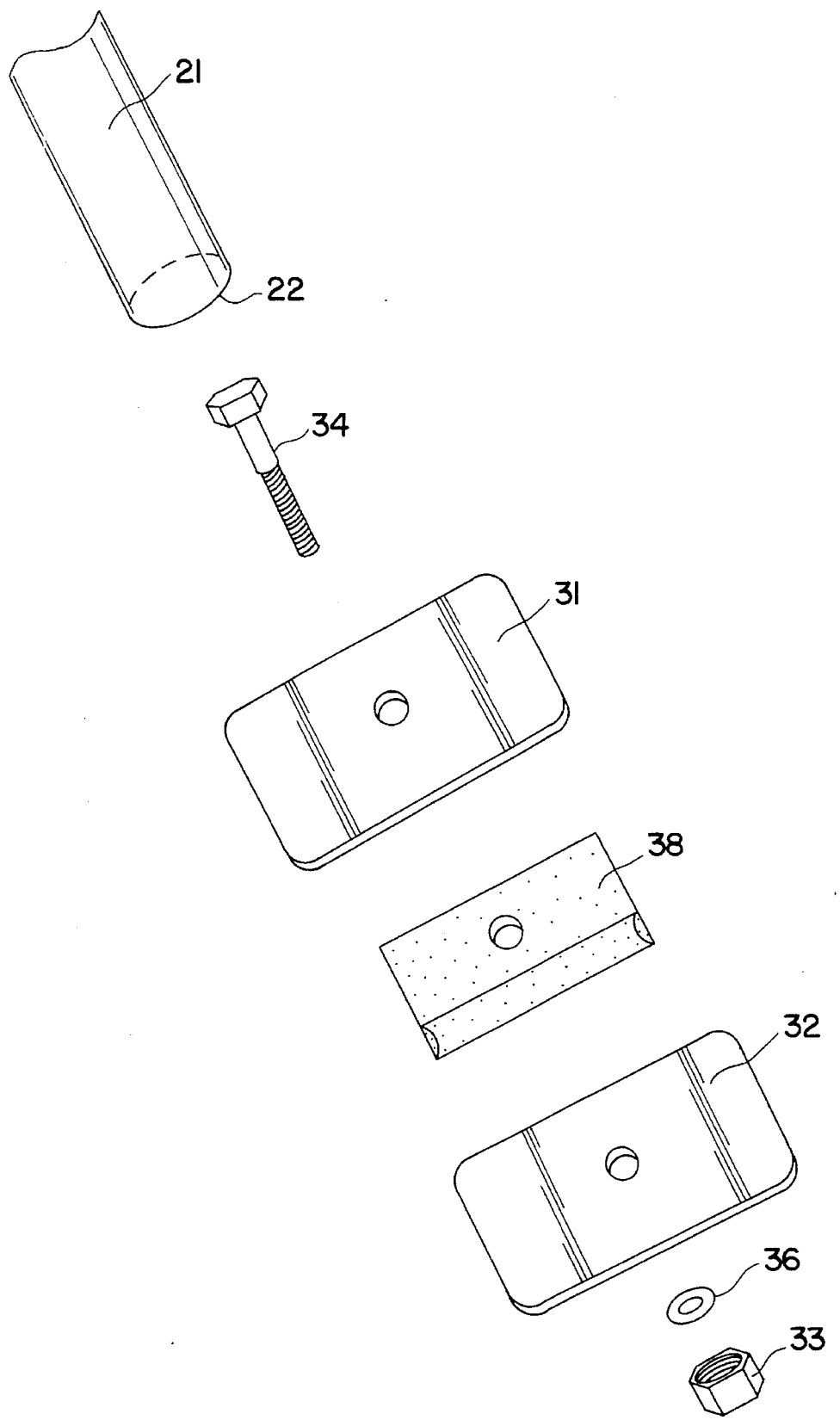
FIG. 4 is an exploded view of the attachment means for attaching the control bar to the bicycle frame.
Figure 5:
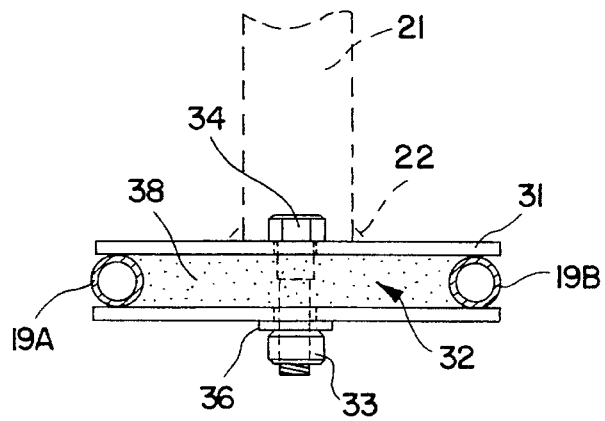
FIG. 5 is a cross-sectional view of the seat stay support legs of the bicycle frame with the attachment means secured to the support legs, and showing a portion of the control bar in phantom.

The attachment means for removably attaching the control bar 21 to the bicycle 11 is illustrated in detail in FIGS. 3, 4, and 5. As best shown in FIGS. 4 and 5, the attachment means includes first and second mounting plates 31 and 32 for being interconnected on opposite sides of the seat stay support legs 19A and 19B by a threaded nut 33 and bolt 34. The control bar 21 is preferably positioned over the head of the bolt 34, and permanently welded to a top surface of the first mounting plate 31. The threaded end of the bolt 34 extends through the second mounting plate 32, and cooperates with the nut 33 to clamp the mounting plates 31 and 32 to the support legs 19A and 19B thereby securing the control bar 21 to the bicycle 11. A locking washer 36 may be placed between the nut 33 and second mounting plate 32 to further secure the attachment of the nut 33 to the bolt 34.

Preferably, a resilient, compressible foam rubber spacer 38 is located between the first and second mounting plates 31 and 32 and the seat stay support legs 19A and 19B as shown in FIG. 5. The spacer 38 provides for adjustment of the attachment means relative to the distance between the support legs 19A and 19B, and the diameter of the support legs 19A and 19B. For example, to fit bicycles 11 with relatively closely spaced seat stay support legs 19A and 19B, the spacer 38 compresses along the plane of the mounting plates 31 and 32 to reside snugly between the support legs 19A and 19B. For bicycles 11 with relatively small diameter support legs 19A and 19B, the spacer 38 compresses to reduce the distance between the mounting plates 31 and 32. Thus, the training attachment 10 is applicable for use with bicycles 11 of various sizes and frame designs. Moreover, the side edges of the spacer 38 are preferably contoured to better fit against the support legs 19A and 19B of the seat stay 18.

Figure 6:
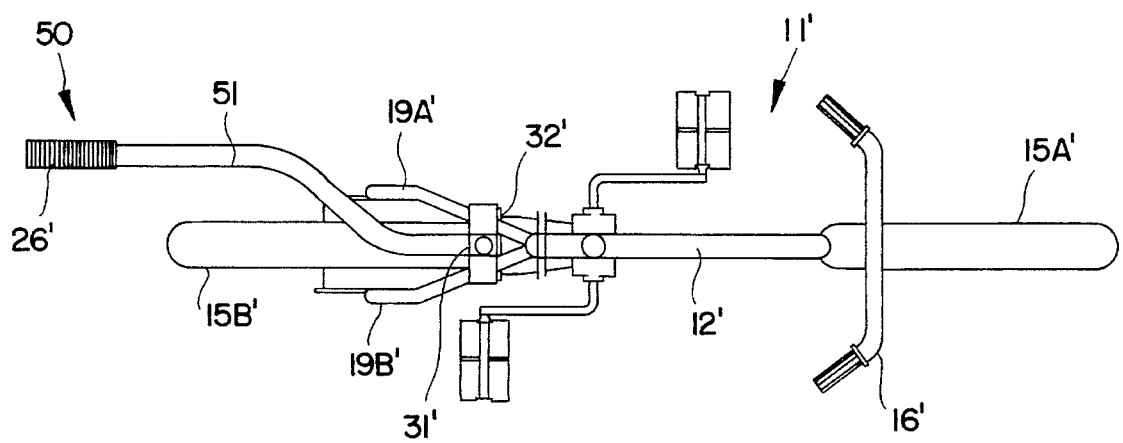
FIG. 6 is a top plan view of the bicycle with the seat removed, and illustrating a second embodiment of the training attachment.

FIG. 6 illustrates a further embodiment of the training attachment 50. Like elements described above with reference to the training attachment 10 are indicated in prime notation.

As shown in FIG. 6, the control bar 51 extends outwardly from the rear of the bicycle 11' and angles towards one side of the bicycle 11'. This allows the trainer to readily control the bicycle 11' while walking or running alongside of the trainee rider. The orientation of the control bar 51 may be changed to located the handle grip 26' on either side of the bicycle 11' by rotating the control bar 51 180 degrees and reattaching the mounting plates 31' and 32' to the support legs 19A' and 19B', as described above.

A training attachment for a bicycle is described above. Various details of the invention may be changed without departing from its scope. Furthermore, the foregoing description of the preferred embodiment of the invention is provided for the purpose of illustration only and not for the purpose of limitation-the invention being defined by the claims.

We claim:

1. In combination with a bicycle including a frame carrying a seat, front and rear wheels, a seat stay having first and second spaced apart legs extending downwardly and rearwardly from the seat to the rear wheel, and a handle bar for steering, the improvement comprising a training attachment used by a trainer for assisting a trainee rider of the bicycle in maintaining balance, said training attachment comprising:

(a) an elongate control bar having a free end thereof located in an outwardly extending access position for being gripped by the trainer, and a proximal end thereof attached to the bicycle;

(b) a first mounting plate connected to the proximal end of said control bar, and engaging a top side of the seat stay;

(c) a second mounting plate spaced-apart from the first mounting plate, and engaging a bottom side of the seat stay;

(d) connecting means for connecting the first and second mounting plates together in clamping relation to the first and second legs of the seat stay; and (e) a compressible resilient spacer engaging the first and second mounting plates and the first and second legs of the seat stay in a position between the first and second legs of the seat stay, said spacer being compressible along its length, width, and depth, and cooperating with said connecting means and said first and second mounting plates to provide adjustable and locking attachment of the control bar to the first and second legs of the seat stay.

2. A combination according to claim 1, wherein said connecting means comprises a threaded bolt extending though the first and second mounting plates, and cooperating with a complementary threaded nut to connect the first and second mounting plates together in clamping relation to the support legs of the seat stay.

3. A combination according to claim 1, wherein said resilient spacer is formed of a foam rubber material.

4. A combination according to claim 1, and including a handle grip located on the free end of the control bar.

5. A training attachment for use with a bicycle including a frame carrying a seat, front and rear wheels, a seat stay having first and second spaced apart legs extending downwardly and rearwardly from the seat to the rear wheel, and a handle bar for steering, the training attachment being used by a trainer for assisting a trainee rider of the bicycle in maintaining balance, said training attachment comprising:

(a) an elongate control bar having a free end thereof located in an outwardly extending access position for being gripped by the trainer, and a proximal end thereof attached to the bicycle;

(b) a first mounting plate connected to the proximal end of said control bar, and engaging a top side of the seat stay;

(c) a second mounting plate spaced-apart from the first mounting plate, and engaging a bottom side of the seat stay;

(d) connecting means for connecting the first and second mounting plates together in clamping relation to the first and second legs of the seat stay; and (e) a compressible resilient spacer engaging the first and second mounting plates and the first and second legs of the seat stay in a position between the first and second legs of the seat stay, said spacer being compressible along its length, width, and depth, and cooperating with said connecting means and said first and second mounting plates to provide adjustable and locking attachment of the control bar to the first and second legs of the seat stay.

6. A training attachment according to claim 5, wherein said connecting means comprises a threaded bolt extending though the first and second mounting plates, and cooperating with a complementary threaded nut to connect the first and second mounting plates together in clamping relation to the support legs of the seat stay.

7. A training attachment according to claim 5, wherein said resilient spacer is formed of a foam rubber material.

8. A training attachment according to claim 5, and including a handle grip located on the free end of the control bar.

* * * * *